United States Patent

Stapfer et al.

[15] 3,666,772
[45] May 30, 1972

[54] PREPARATION OF PYRAZOLINES BY CYCLIZATION OF AN AZINE

[72] Inventors: Christian H. Stapfer, Newtown; Richard W. D'Andrea, New Hope, both of Pa.

[73] Assignee: Carlisle Chemical Works, Inc., Reading, Ohio

[22] Filed: Feb. 26, 1970

[21] Appl. No.: 14,628

[52] U.S. Cl. .................260/310 D, 260/313.1, 260/319.1, 260/566 B
[51] Int. Cl. ..........................................C07d 49/10
[58] Field of Search ..............................260/310 D

[56] References Cited

FOREIGN PATENTS OR APPLICATIONS 443,313   2/1968   Switzerland.......................260/310 D

OTHER PUBLICATIONS

Chaco et al. J. Org. Chem. Vol. 27, pages 2,765– 7 (1962). QD241.J6
Curtius et al. Berichte Vol. 27, pages 770– 3 (1894). QD1.D4
Elderfield Heterocyclic Compounds Vol. 5, pages 88– 9 N.Y., Wiley, 1957. QD400.E4
Kishner Chemisches Zentralblatt Vol. 83, I, pages 2025– 6(1912). QD1.C7
Kost et al. Chem. Abst. Vol. 51, Columns 1943– 4 (1957). QD1.A51
Wiley et al. Pyrazoles, Pyrazolines, Pyrazolidines, Indazoles and Condensed Rings Page 192 N.Y., Interscience, 1967 QD401.W5p

*Primary Examiner*—Natalie Trousof
*Attorney*—Cushman, Darby & Cushman

[57] ABSTRACT

Alkyl substituted pyrroles and pyrazolines are prepared by treating a ketazine or aldazine with a metal halide of the formula $MX_2$ where M is cobalt or nickel and X is a halogen at a temperature of 10° to 300° C.

5 Claims, No Drawings

PREPARATION OF PYRAZOLINES BY CYCLIZATION OF AN AZINE

The present invention relates to the preparation of alkyl substituted pyrroles and pyrazolines.

Numerous procedures have been proposed in the past for preparing alkyl pyrroles and alkyl pyrazolines. However, such procedures are expensive and the yields of the desired product are low.

It is an object of the present invention to develop an improved process for preparing alkyl pyrroles.

Another object is to develop an improved process for preparing alkyl pyrazolines.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by (1) treating an azine of the formula

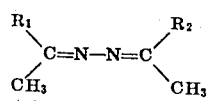

where $R_1$ and $R_2$ are hydrogen or lower alkyl, e.g., alkyl of one to four carbon with a catalytic amount of a metal halide of the formula $MX_2$ where M is cobalt or nickel and X is a halogen to form a 2-pyrazoline of the formula

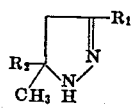

or (2) treating an azine of the formula

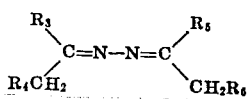

where $R_3$ and $R_5$ are hydrogen or lower alkyl of two or more, e.g., four or five carbon atoms and $R_4$ and $R_6$ are lower alkyl, e.g., one to four carbon atoms or $R_3$ together with $R_4CH_2$— form a ring with six methylene units and/or $R_5$ together with $R_6CH_2$ — forms a ring with six methylene units with a catalytic amount of a metal halide of the formula $MX_2$ with elimination of one mole of ammonia to form a substituted pyrrole of the formula

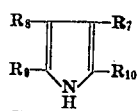

where $R_7$ and $R_8$ are lower alkyl, e.g., of one to four carbon atoms and $R_9$ and $R_{10}$ are hydrogen or lower alkyl of at least two carbon atoms, e.g., two or four carbon atoms or $R_8$ together with $R_9$ forms a ring with six methylene units and/or $R_7$ together with $R_{10}$ forms a ring with six methylene units.

Both reactions (1) and (2) can be carried out over a wide range of temperatures, e.g., 10° to 300° C, preferably 20° to 200° C.

As the catalyst $MX_2$ these can be used: $CoCl_2$, $CoI_2$, $CoF_2$, $CoBr_2$, $NiCl_2$, $NiBr_2$, $NiF_2$ or $NiI_2$.

As the starting azine, these can be used acetaldazine, propionaldazine, butyraldazine, isobutyraldazine, valeraldazine, acetone azine, methyl ethyl ketazine, diethyl ketazine (3-pentanone azine), methyl propyl ketazine, methyl butyl ketazine, dibutyl ketazine, dipropyl ketazine, ethyl butyl ketazine, ethyl propyl ketazine, propyl butyl ketazine, cyclohexanone azine.

The cobalt and nickel halide catalysts are generally used in an amount of 0.001 to 5 parts per 100 parts by weight of azine. However, the proportion is not critical, e.g., the azine can be passed over the supported catalyst so that 10, 50 or more parts of catalyst are present per part of azine, although the use of such large amounts of catalyst is not the most economical method of operation.

Examples of compounds which can be prepared according to the present invention are 3,5,5-trimethyl-2-pyrazoline, 5-methyl-2-pyrazoline, 3,5-diethyl-5-methyl-2-pyrazoline, 3,5-dibutyl-5-methyl-2-pyrazoline, 3-butyl-5-methyl-pyrazoline, 3-butyl-5-propyl-5-methyl-2-pyrazoline, 3-isopropyl-5-methyl-2-pyrazoline, 3-ethyl-5-methyl-2-pyrazoline, 3,5-dimethyl-2-pyrazoline, 3,4-dimethyl pyrrole, 2,5-diethyl-3,4-dimethyl pyrrole, octahydrocarbazole, 2,3,4,5-tetraethyl pyrrole, 2,5-dibutyl-3,5-dimethyl pyrrole, 2-propyl 3,4-diethyl pyrrole, 3,4-di(isopropyl) pyrrole, 2,5-diethyl-3,4-dibutyl pyrrole.

In general, the yields of pyrazolines are higher than the yields of pyrrole. This is apparently due to the fact that in the reaction to form the pyrrole the pyrrole ammonia is eliminated quantitatively and the hydrogen abstraction which takes place is accompanied by the formation of polymeric materials which reduces the yields.

It has further been observed that whenever both a methyl and a methylene group are concurrently adjacent to the nitrogen bonded carbon atoms, as in the case of methyl ethyl ketazine (2-butanone azine), the methyl group prevails and the intermediate transition metal complex formed favors the formation of a pyrazoline.

Unless otherwise indicated, all parts and percentages are by weight.

EXAMPLE 1

0.5 g of anhydrous cobalt (II) chloride was added to 112 g of acetone azine and the reaction mixture was kept at reflux for 24 hours. Upon fractional distillation 86 g (77 percent yield) of pure 3,5,5-trimethyl-2-pyrazoline was isolated. This compound was characterized by its physical constants m.p. = −8° C; $bp_{160} = 156°–160°$ C.

Calculated for $C_6H_{12}N_2$:

C = 64.28%; H = 10.80%; N = 25.00%

Found:

C = 64.32%; H = 10.75%; N = 24.95%

EXAMPLE 2

Eighty-four grams of acetaldazine was refluxed for 12 hours in presence of 0.01 g of nickel (II) chloride and after fractional distillation, 42 g (50 percent yield) of 5-methyl-2-pyrazoline $bp_{55} = 73°$ C. The picrate of the pyrazoline had a M.P. of 127° C.

The pyrazoline compound was identical to a sample of 5-methyl-2-pyrazoline prepared by other known synthetic routes.

EXAMPLE 3

A mixture of 140 g of methylethyl ketazine and 1 g of cobalt (II) bromide was refluxed for 24 hours according to the general procedure of the preceeding examples. After the usual distillation under vacuum, 88.6 g (63 percent yield) of pure 3,5-diethyl-5-methyl-2-pyrazoline boiling at 195°–200° C/760 mm Hg was obtained.

Calculated for $C_8H_{16}N_2$:

C = 68.6%; H = 11.4%; N = 20.0%

Found:
 C = 69.0%; H = 11.4%; N = 19.7%

EXAMPLE 4

0.5 g of anhydrous cobalt (II) iodide was added to a solution of 168 g of 3-pentanone azine in 250 ml of o-xylene and the reaction mixture was refluxed for 24 hours. The xylene was evaporated and the residue distilled under high vacuum. Seventy-five grams (50 percent yield) of 3,4-dimethyl-2,5 diethyl pyrrole $bp_{55}$ = 155° C was isolated. The yellow oil, discoloring rapidly in air, was characterized by elemental analysis and nuclear magnetic resonance.
Calculated for $C_{10}H_{17}N$:
 C = 79.53%; H = 11.32%; N = 9.27%
Found:
 C = 79.50%; H = 11.29% N = 9.29%

EXAMPLE 5

The general procedure of Example 4 was adopted for the preparation of 49 g (46 percent yield) of 3,4-dimethyl pyrrole from 112 g of propional azine and 1.0 g of nickel (II) bromide. $bp_{760}$ = 192° C.

EXAMPLE 6

A mixture of 192 g of cyclohexanone azine and 1.0 g of anhydrous nickel (II) chloride was maintained under agitation at 200° C for 24 hours. Upon cooling the reaction mixture crystallized and upon recrystallization from petroleum ether 145 g (83 percent yield) of pure octahydrocarbazole was isolated. m.p. = 100° – 101° C; picrate m.p. = 134°–135° C.
Calculated for $C_{12}H_{17}N$:
 C = 82.24%; H = 9.76%; N = 7.99%

Found:
 C = 81.88%; H = 9.69%; N = 7.99%.

What is claimed is:

1. A process for the cyclization of an aldazine or ketazine of the formula

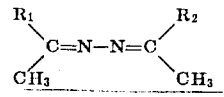

where $R_1$ and $R_2$ are hydrogen or lower alkyl to form an alkyl 2-pyrazoline of the formula

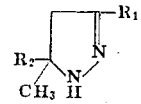

comprising treating the azine with a metal halide of the formula, $MX_2$ where M is cobalt or nickel and X is a halogen, the $MX_2$ is used in an amount of at least 0.001 part per 100 parts of azine and the reaction is carried out at a temperature of 10° to 300° C.

2. A process according to claim 1 wherein $R_1$ and $R_2$ are both methyl.

3. A process according to claim 2 wherein the $M_eX_2$ is used in an amount of from 0.001 up to 50 parts per part of azine.

4. A process according to claim 1 wherein X is chlorine, bromine or iodine.

5. A process according to claim 1 wherein $R_1$ and $R_2$ are both ethyl.

* * * * *